United States Patent
Okamoto et al.

(10) Patent No.: US 10,495,190 B2
(45) Date of Patent: Dec. 3, 2019

(54) GEAR ASSEMBLY

(71) Applicant: TOYOTA JIDOSHA KABUSHIKI KAISHA, Toyota-shi, Aichi-ken (JP)

(72) Inventors: Daisuke Okamoto, Fujinomiya (JP); Naoki Moriguchi, Susono (JP); Masayuki Ishibashi, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 316 days.

(21) Appl. No.: 15/414,148

(22) Filed: Jan. 24, 2017

(65) Prior Publication Data

US 2017/0211662 A1   Jul. 27, 2017

(30) Foreign Application Priority Data

Jan. 26, 2016  (JP) .................... 2016-012147

(51) Int. Cl.
*F16H 55/17* (2006.01)
*F16H 3/66* (2006.01)
*F16H 57/08* (2006.01)
*F16H 57/04* (2010.01)

(52) U.S. Cl.
CPC ............ *F16H 3/663* (2013.01); *F16H 55/17* (2013.01); *F16H 57/08* (2013.01); *F16H 57/04* (2013.01); *F16H 57/0467* (2013.01); *F16H 2200/0052* (2013.01); *F16H 2200/2005* (2013.01); *F16H 2200/2007* (2013.01); *F16H 2200/2023* (2013.01); *F16H 2200/2043* (2013.01); *F16H 2200/2066* (2013.01); *F16H 2200/2082* (2013.01)

(58) Field of Classification Search
None
See application file for complete search history.

(56) References Cited

U.S. PATENT DOCUMENTS

| | | | | |
|---|---|---|---|---|
| 1,459,552 A | * | 6/1923 | Rathman | F04C 2/088 192/61 |
| 4,825,723 A | * | 5/1989 | Martin | B64C 13/34 475/330 |
| 4,963,124 A | * | 10/1990 | Takahashi | F16H 3/66 475/276 |
| 6,732,606 B1 | | 5/2004 | Zhu et al. | |
| 2008/0104842 A1 | | 5/2008 | Michaud et al. | |
| 2008/0194377 A1 | * | 8/2008 | Mordukhovich | G04B 13/02 475/331 |

(Continued)

FOREIGN PATENT DOCUMENTS

| CN | 103657943 A | 6/2014 |
|---|---|---|
| CN | 104520069 A | 4/2015 |

(Continued)

*Primary Examiner* — Justin Holmes
(74) *Attorney, Agent, or Firm* — Hunton Andrews Kurth LLP

(57) ABSTRACT

A gear assembly wherein transmission efficiency is enhanced by a simple treatment is provided. The gear assembly includes a plurality of gears to transmit torque of a prime mover to an output member. Tooth surfaces of a first gear rotated at a highest speed are individually finished into a plateau surface, and a parameter representing a surface roughness of each of the plateau surface is smaller than those of the tooth surfaces of the other gears.

9 Claims, 9 Drawing Sheets

(56) References Cited

U.S. PATENT DOCUMENTS

| | | | |
|---|---|---|---|
| 2010/0071495 A1* | 3/2010 | Satou | F16C 19/46 74/457 |
| 2010/0300229 A1* | 12/2010 | Sato | B24B 31/003 74/457 |
| 2014/0326092 A1 | 11/2014 | Tokozakura et al. | |
| 2015/0082930 A1* | 3/2015 | Okamoto | F16H 55/0886 74/458 |
| 2015/0192195 A1 | 7/2015 | Okamoto et al. | |
| 2017/0234417 A1 | 8/2017 | Yamashita et al. | |

FOREIGN PATENT DOCUMENTS

| | | |
|---|---|---|
| DE | 60130835 T2 | 7/2008 |
| EP | 3187752 A1 | 7/2017 |
| JP | 3569537 B2 | 9/2004 |
| JP | 2004-308665 A | 11/2004 |
| JP | 2004-308817 A | 11/2004 |
| JP | 2005-214339 A | 8/2005 |
| JP | 2007-516096 A | 6/2007 |
| JP | 2009-236244 A | 10/2009 |
| JP | 2014-095392 A | 5/2014 |
| WO | 2004/108356 A1 | 12/2004 |

* cited by examiner

|  | C1 | C2 | B1 | B2 | B3 | F1 |
|---|---|---|---|---|---|---|
| 1st | ○ |  |  | (○) |  | (○) |
| 2nd | ○ |  | ○ |  |  |  |
| 3rd | ○ |  |  |  | ○ |  |
| 4th | ○ | ○ |  |  |  |  |
| 5th |  | ○ |  |  | ○ |  |
| 6th |  | ○ | ○ |  |  |  |

GEAR ASSEMBLY

CROSS REFERENCE TO RELATED APPLICATION

The present invention claims the benefit of Japanese Patent Application No. 2016-012147 sled on Jan. 26, 2016 with the Japanese Patent Office, the disclosures of which are incorporated herein by reference in its entirety.

BACKGROUND

Field of the Invention

Embodiments of the present application relate to the art of a gear assembly having a plurality of gears, and especially to a texture of tooth surface of the gear.

Discussion of the Related Art

JP-A-2004-308665 describes a gear having enhanced lubricating oil holding property between tooth faces of a hypoid pinion fitted onto drive shaft and a hypoid ring gear connected to a driven shaft. According to the teachings of JP-A-2004-308665, the skewness of the tooth flanks is set at −1 or less and the maximum height Ry is set at 3 or less so that Ry/Ra falls within 6-12. JP-A-2004-308817 describes a gear pair in which a tooth surface of one of gears is adjusted to as taught by JP-A-2004-308665. According to the teachings of JP-A-2004-308817, in the other gear, skewness is set at 0-1.5 and the maximum height Ry is set at 3 or less so that Ry/Ra is restricted to 6 or less.

PCT international publication WO 2004/108356 A1 describes a planetary gearbox comprising a hollow wheel gear, two or more planet gears, and a sun gear. In order to reduce metal debris generated by metal-to-metal contact during torque transmission, according to the teachings of WO 2004/108356 A1, tooth surface of each gear is superfinished to a surface roughness of 0.25 μm or JP-A-2014-95392 describes a gear having an enhanced power transmission efficiency and strength of tooth face. According to the teachings of JP-A-2014-95392, in order to keep a proper thickness of an oil film between tooth surfaces, an arithmetic average roughness Ra of the tooth surface is restricted to 0.15 μm or less, and a height Rpk of a projection part is adjusted between 0.01 μm and 0.1 μm.

JP-A-2005-214339 describes a deceleration mechanism in which an engagement friction between a metal driving gear and a resin driven gear is reduced. According to the teachings of JP-A-2005-214339, an arithmetical average surface roughness Ra of gear teeth of the drive gear is adjusted less than 0.1 μm.

JP-A-2009-236244 describes a gear treatment method for extending a fatigue life of gear. According to the teachings of JP-A-2009-236244, thermal treatment is applied to at least one of tooth flanks of a first gear and a second gear engaged with each other, and then shot peening is applied to said one of tooth flanks. Preferably, the shot peening is applied to the tooth flank meshed more frequently than the other tooth flank or harder than the other tooth flank.

Thus, according to the foregoing prior art documents, surface texture of a tooth surface of gear is adjusted in such a manner as to reduce friction between gears. In the conventional tooth forming method, the tooth forming is carried out first of all and then the hardening treatment is applied to the tooth, and thereafter the surface treatment is applied to the tooth surface. That is, if the tooth surfaces of a plurality of gears are treated by the conventional tooth forming method, man-hour may be increased and production yield may be lowered. Consequently, production cost of gears and a gear unit may be increased.

In addition, in a powertrain of automobile, high-strength gears are used to transmit large torque from a prime mover to drive wheels. For this reason, the drive gear taught by JP-A-2005-214339 may not be suitable to be used in a powertrain of automobile.

SUMMARY

Aspects of embodiments of the present application have been conceived noting the foregoing technical problems, and it is therefore an object of embodiments of the present invention is to provide a gear assembly wherein transmission efficiency is enhanced by a simple treatment applied to tooth surface of a gear.

Embodiment of the present application relates to a gear assembly including a plurality of gears to transmit torque of a prime mover to an output member. In order to achieve the above-explained objective, according to the embodiment of the present application, tooth surfaces of a first gear that is rotated at a highest speed are individually finished into a plateau surface. In addition, a parameter representing a surface roughness of each of the plateau surface is smaller than those of the tooth surfaces of the other gears.

In a non-limiting embodiment, the parameter may include a skewness of the plateau surface.

In a non-limiting embodiment, an arithmetic mean roughness Ra of each of the plateau surface may be smaller than 0.15 μm. In addition, a reduced peak height Rpk may be adjusted between 0.01 μm and 0.1 μm.

In a non-limiting embodiment, the gear assembly may comprise: an input element to which torque of the prime mover is applied; an output element that delivers the torque to the output member; a reaction element that establishes a reaction torque to allow the output element to output the torque applied to the input element; and a pinion gear that is supported by at least said one of the rotary elements. The pinion gear may be meshed with at least one of another rotary elements. In addition, the first gear may include a gear that is rotated at a highest speed in said another rotary elements and the pinion gear.

In a non-limiting embodiment, the gear assembly may include a geared transmission in which a gear stage thereof is changed stepwise, and rotational speeds of the rotary elements and the pinion gear are changed depending on the gear stage of the gear assembly. In addition, the first gear may include a gear that is rotated at a highest speed in said another rotary elements and the pinion gear in a predetermined gear stage.

In a non-limiting embodiment, the predetermined gear stage may include a gear stage that is selected most frequently.

In a non-limiting embodiment, the pinion gear may include a first pinion meshed with one of said another rotary elements, and a second pinion gear meshed with another one of said another rotary elements.

In a non-limiting embodiment, the gear assembly may comprise a gear pair including the first gear to which the torque of the prime mover is applied, and a second gear connected to the output member while being meshed with the first gear. In the gear pair, the first gear is rotated faster than the second gear.

In a non-limiting embodiment, the gear assembly may comprise a gear pair including the first gear connected to the output member, and a third gear meshed with the first gear to which the torque of the prime mover is applied. In the gear pair, the first gear is rotated faster than the third gear.

Thus, according to the embodiment of the present application, tooth surfaces of the first gear that is rotated at a highest speed are individually finished into a plateau surface, and a parameter representing a surface roughness of each of the plateau surface is smaller than those of the tooth surfaces of the other gears. According to the embodiment, therefore, the transmission efficiency of the gear assembly may be enhanced by polishing only the tooth surfaces of the first gear rotated at the highest speed and involved in torque transmission most frequency.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 2:
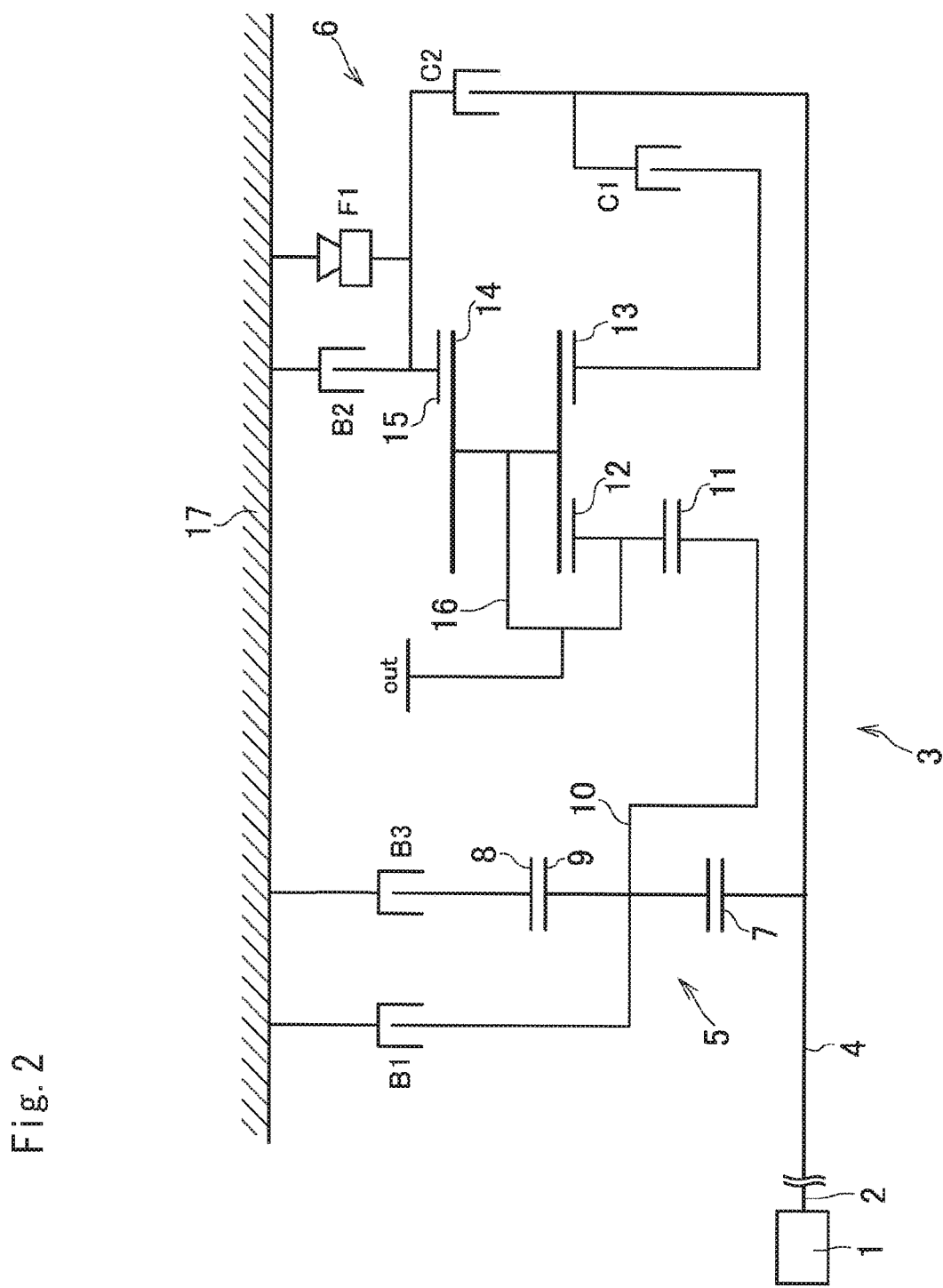
FIG. 2 is a schematic illustration showing a structure of the gear assembly according to the preferred embodiment.

Referring now to FIG. 2, there is schematically shown a preferred embodiment of the gear assembly according to the present application. In the gear assembly shown in FIG. 2, a torque converter (not shown) is connected to an output shaft 2 of an engine 1 as a prime mover of a vehicle, and an input shaft 4 of a transmission mechanism 3 is connected to the input shaft 2 of the engine 1. Specifically, the transmission mechanism 3 is a geared transmission comprising a single-pinion planetary gear set (to be called the first planetary gear set hereinafter) 5 and a Ravigneaux planetary gear set (to be called the second planetary gear set hereinafter) 6, and drive wheels (not shown) are connected to the transmission mechanism 3. In the transmission mechanism 3, a gear stage may be selected from a first stage to a sixth stage to change a speed ratio stepwise. Here, a speed ratio of the transmission mechanism 3 is a ratio between a rotational speed of the prime mover and a rotational speed of the output member.

The first planetary gear set 5 comprises a first sun gear 7 connected to the input shaft 4 of the transmission mechanism 7, a first ring gear 8 arranged concentrically with the first sun gear 7, a plurality of pinion gears 9 interposed between the first sun gear 7 and the first ring gear 8 while being meshed with those gears, and a first carrier 10 supporting the pinion gears 9 in such a manner as to allow the pinion gears 9 to revolve around the first sun gear that is, around a rotational center of the first carrier 10.

The second planetary gear set 6 comprises a second sun gear 11 connected to the first carrier 10, a plurality of short pinion gears 12 meshed with the second sun gear 11, a third sun gear 13 fitted onto the input shaft 4 while being allowed to rotate relatively thereto, a plurality of long pinion gears 14 meshed with the short pinion gear 12 and the third sun gear 13, a second ring gear 15 arranged concentrically with the third sun gear 13 while being meshed with the long pinion gear 14, and a second carrier 16 connected to the drive wheels (not shown) while supporting the short pinion gears 12 and the long pinion gears 14 in such a manner as to allow the short pinion gears 12 and the long pinion gears 14 to revolve around the input shaft 4. Thus, the second planetary gear set 6 comprises: a double-pinion planetary gear set comprising the second sun gear 11, the short pinion gears 12, the long pinion gears 14, and the second ring gear 15; and a single-pinion planetary gear set comprising the long pinion gears 14, the second ring gear 15, and the third sun gear 13. As described, the short pinion gears 12 and the long pinion gears 14 are allowed to revolve around the rotational center of the second carrier 16.

The transmission mechanism 3 further comprises a first clutch C1 that selectively connects the input shaft 4 to the third sun gear 13, a second clutch C2 that selectively connects the input shaft 4 to the second ring gear 15, a first brake B1 that selectively connects the first carrier 10 to a casing 17, a second brake B2 that selectively connects the second ring gear 15 to the casing 17, a third brake B3 that selectively connects the first ring gear 8 to the casing 17, and a one-way clutch F1 that restricts the second ring gear 15 to rotate in an opposite direction to a rotational direction of the input shaft 4.

Figures 3, 4:
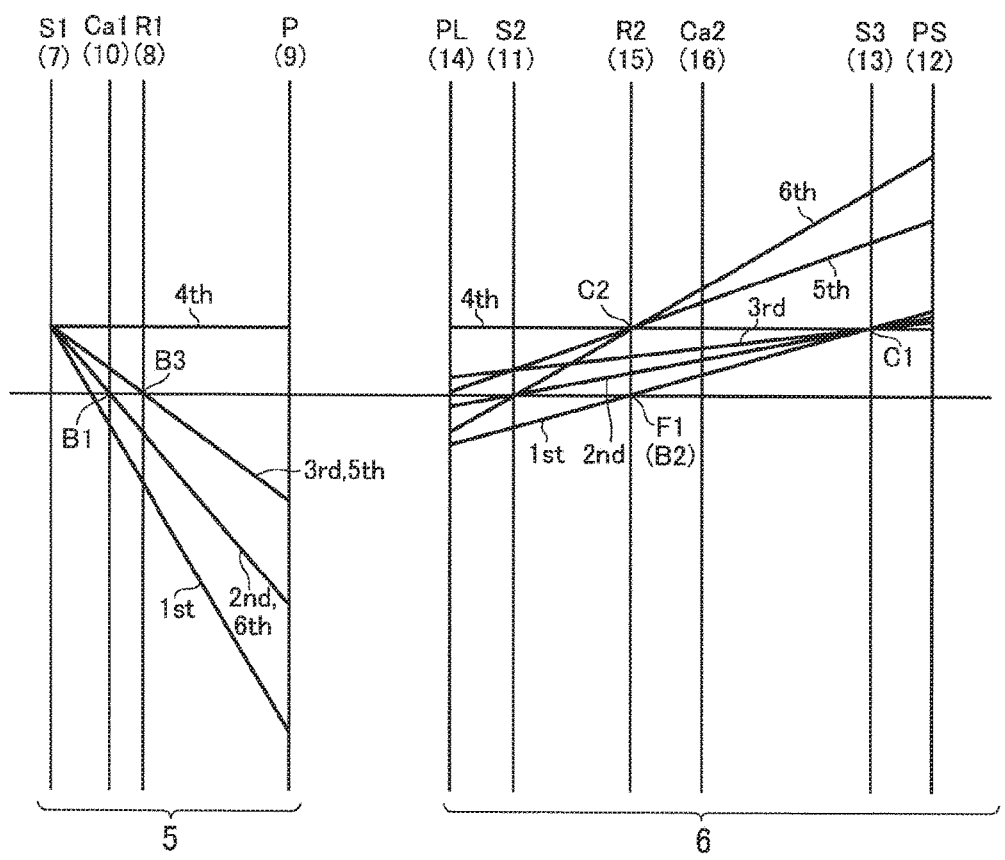
FIG. 3 is a table showing engagement states of the engagement elements in each gear stage.
FIG. 4 is a nomographic diagram indicating rotational speeds of rotary elements of the gear assembly shown in FIG. 2.

The gear stage of the transmission mechanism 3 is changed by manipulating the clutches C1 and C2, and the brakes B1, B2 and B3. In the following description, the clutches C1 and C2, the brakes B1, B2 and B3 and the one-way clutch F1 will also be called the engagement device E. Engagement states of the engagement devices E in each gear stage are indicated in FIG. 3. In FIG. 3, "O" represents an engagement of the engagement devices E. As indicated in FIG. 3, the first clutch C1 is engaged to establish the first forward stage. Specifically, when the first clutch C1 is in engagement, the one-way clutch F1 is engaged automatically by generating a drive torque by the engine 1 at relatively low speed so that the first forward stage is established. In the first forward stage, the second brake B2 may be engaged to establish an engine braking force by applying the torque to the second ring gear 15 so as to disengage the one-way clutch F1. Thus, in the first forward stage, one of the second brake B2 and the one-way clutch F1 is engaged depending on the situation as indicated by "(O)" in FIG. 3.

The second forward stage is established by engaging the first clutch C1 and the first brake B1. The third forward stage is established by engaging the first clutch C1 and the third brake B3. The fourth forward stage is established by engaging the first clutch C1 and the second clutch C2. The fifth forward stage is established by engaging the second clutch C2 and the third brake B3. The sixth forward stage is established by engaging the second clutch C2 and the first brake B1.

Turning to FIG. 4, there is shown a nomographic diagram indicating rotational speeds of the rotary elements of the transmission mechanism 3 in each stage. Here, in FIG. 4, the rotational speed of the first sun gear 7 is indicated as a constant speed for the sake of convenience.

As described, the gears 7, 8, 9, 11, 12, 13, 14 and 15 of the transmission mechanism 3 are arranged in a powertrain between the engine 1 and the drive wheels, a relatively large torque is applied to each of the gears of the transmission mechanism 3. In order to bear such large transmission torque, the gears of the transmission mechanism 3 are made of high strength material such as metal. To this end, in the preferred embodiment, a helical gear is used as each of the gears 7, 8, 9, 11, 12, 13, 14 and 15, and edges of teeth of each of the gears are set at a predetermined angle with respect to a rotational center axis thereof. However, a spur gear in which teeth are formed parallel to a rotational center axis thereof may also be used in the transmission mechanism 3.

The gears 7, 8, 9, 11, 12, 13, 14 and 15 are manufactured by the conventional the conventional manufacturing method. Specifically, those gears are manufactured by forming a fabricated material by applying a rolling process, a turning process, and a gear-cutting process to material, and thereafter applying a surface treatment such as a grinding to tooth surfaces.

As indicated in FIG. 4, in the first planetary gear set 5, the pinion gears 9 are rotated at the highest speed in the first forward stage. On the other hand, in the second planetary gear set 6, the short pinion gears 12 are rotated at the highest speed in the sixth forward stage. According to the preferred embodiment, after grinding the tooth surfaces of the pinion gears 9 and the short pinion gears 12, a polishing treatment such as a chemical polishing, an electrolytic polishing, a resin polishing, a lapping or the like is further applied to the tooth surfaces of the above-mentioned pinion gears 9 and 12 to rub off pointed tops of micro protrusions to finish each of the tooth surface into a plateau surface.

According to the preferred embodiment, therefore, a parameter representing a surface texture (i.e., a surface roughness) of each of the plateau tooth surface of the pinion gears 9 and the short pinion gears 12 is smaller than those of the tooth surfaces of the other gears. For example, skewness Rsk of the profile height distribution of each of the plateau tooth surface of the pinion gears 9 and the short pinion gears 12 is smaller than those of the tooth surfaces of the other gears 7, 8, 11, 13, 14 and 15. Specifically, as specified by JIS (Japanese Industrial Standards) B0601 (corresponding to ISO 4287:1997) skewness Rsk is a mean cube of a roughness profile Z(x) in the dimensionless sampling length lr calculated by raising maximum profile peak height Rp in the profile curve to the third power. Although the skewness Rsk of the assessed roughness profile is employed in the preferred example, skewness Wsk of the assessed waviness profile may also be used to compare the roughness of tooth surfaces.

In order to maintain an oil film between the tooth surfaces and to reduce a resistance between the tooth surfaces during torque transmission, in the pinion gears 9 and the short pinion gears 12, the arithmetic mean roughness Ra of each of the plateau tooth surface is restricted to be smaller than 0.15 μm, and the reduced peak height Rpk is adjusted between 0.01 μm and 0.1 μm. Specifically, as specified by JIS B0601, the arithmetic mean roughness Ra is a roughness average of the profile height deviations from the roughness profile Z(x) within the sampling length lr. On the other hand, as specified by JIS B0671 (corresponding to ISO13565) is an average height of protruding peaks above roughness core profile ln.

The inventors of the present application have found a fact that it is possible to enhance the transmission efficiency of the planetary gear set by polishing only the tooth surfaces of the gear rotated at the highest speed from experimentation. The experimentation was carried out to compare a loss torque of the planetary gear set in which the tooth surfaces of none of the gears is polished, and a loss torque of the planetary gear set in which the tooth surfaces of any one the gears are polished. In the experimentation, a Ravigneaux planetary gear set having a same structure as the second planetary gear set 6 is individually used as each planetary gear set.

In the experimentation, predetermined torque was applied to the second ring gear 15 while stopping the rotation. In this situation, output torque of the second carrier 16 was detected, and the detected output torque of the second carrier 16 is multiplied by a gear ratio of the second planetary gear set 6. Then, the loss torque of the second planetary gear set 6 was calculated based on a difference between the input torque to the second ring gear 15 and the torque thus calculated.

Figure 1:
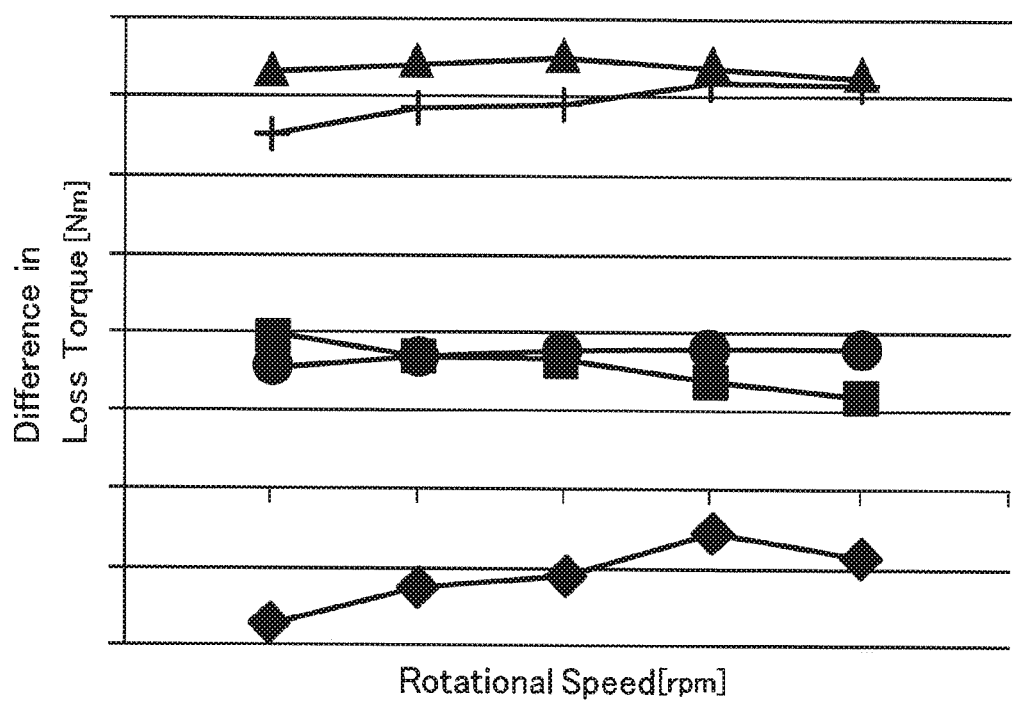
FIG. 1 is a graph indicating reduction in a loss torque of the planetary gear unit in which the tooth surfaces of any one of the gears are polished.

Result of the experimentation is shown in FIG. 1. Specifically, FIG. 1 indicates a difference between the loss torque of the second planetary gear set 6 in which the tooth surfaces of none of the gears was polished, and the loss torque of the second planetary gear set 6 in which the tooth surfaces of any one the gears are polished. In FIG. 1, "+" represents the loss torque of the second planetary gear set 6 in which the tooth surfaces of all of the gears 11, 12, 13 and 14 are polished, "▲" represents the loss torque of the second planetary gear set 6 in which only the tooth surfaces of the short pinion gears 12 were polished, "●" represents the loss torque of the second planetary gear set 6 in which only the tooth surfaces of the long pinion gears 14 were polished, "■" represents the loss torque of the second planetary gear set 6 in which only the tooth surfaces of the second ring gear 15 were polished, and "♦" represents the loss torque of the second planetary gear set 6 in which only the tooth surfaces of the second sun gear 11 were polished. In the experimentation, the third sun gear 13 was not involved in torque transmission and hence the tooth surfaces thereof were not polished.

In FIG. 1, the horizontal axis represents a rotational speed of the second ring gear 15, and the vertical axis represents the difference between the loss torque of the second planetary gear set 6 in which the tooth surfaces of none of the gears was polished, and the loss torque of the second planetary gear set 6 in which the tooth surfaces of any one the gears are polished. That is, the smallest loss torque is indicated at the uppermost level in FIG. 1. Here, in the experimentation, detection errors in the loss torque was approximately ±0.1 μm.

As can be seen from FIG. 1, in the case of polishing only the tooth surfaces of the second sun gear 11, the loss torque was not be reduced from that of the case in which the tooth surfaces of none of the gears was polished. In the case of polishing only the tooth surfaces of the second ring gear 15, and in the case of polishing only the tooth surfaces of the long pinion gears 14, the loss torque was reduced in some measure from that of the case in which the tooth surfaces of none of the gears was polished. In the case of polishing only the tooth surfaces of the short pinion gears 12, the loss torque was reduced in a comparable amount to that of the case in which the tooth surfaces of all of the gears are polished.

As described, the experimentation was carried out in the sixth forward stage of the transmission mechanism 3. In this case, the short pinion gears 12 are rotated at the highest speed, and the second ring gear 15 and the long pinion gears 14 are rotated at substantially same speeds in the opposite direction. In the preferred embodiment, accordingly, the second ring gear 15 serves as the input element, the second sun gear 11 serves as the reaction element, the short pinion gears 12 individually serve as the first gear, and the second carrier 16 serves as the first rotary element.

Thus, the inventors of the present application have found the fact that the loss torque was reduced in a comparable amount to that of the case in which the tooth surfaces of all of the gears were polished, by polishing only the tooth surfaces of the short pinion gears 12 rotated at the highest speed in the second planetary gear set 6. In addition, since the long pinion gears 14 and the second ring gear 15 are rotated at substantially same speeds in the sixth forward stage, and the reductions in the loss torques are comparable in the case that only the tooth surfaces of the long pinion gears 14 were polished and in the case that only the tooth surfaces of the second ring gear 15 were polished, the inventors of the present application have found a certain relation between the rotational speed of the gear in which the tooth surfaces thereof are polished and the reduction in the loss torque.

Figure 5:
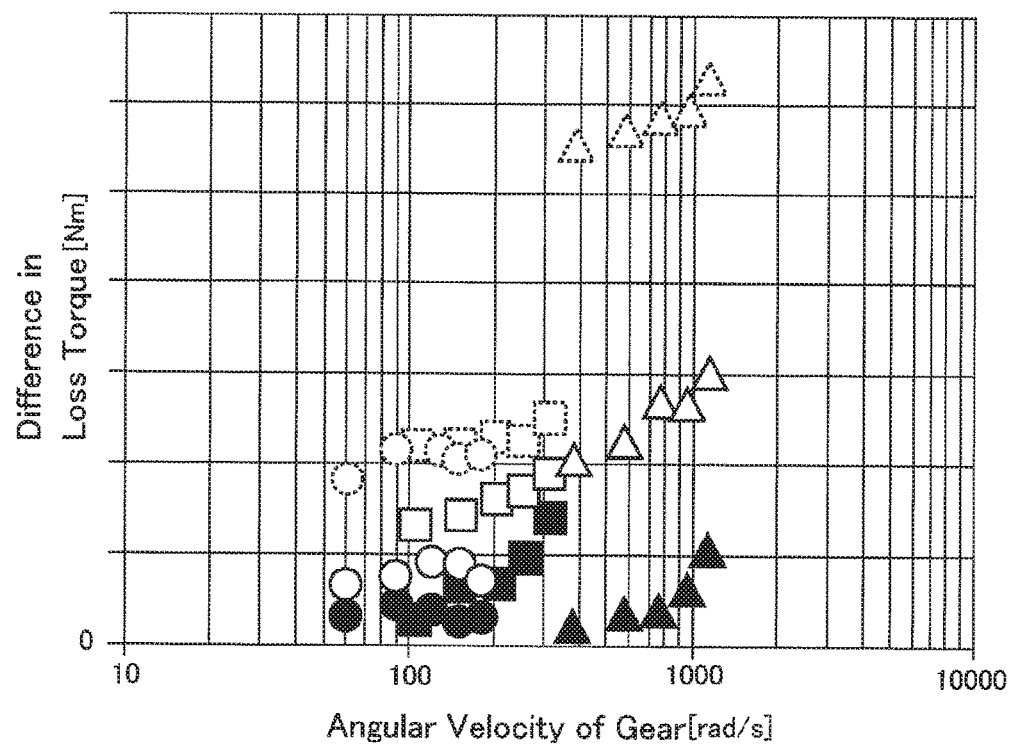
FIG. 5 is a graph indicating changes in a relation between a rotational speed of the gear and the loss torque depending on an input torque.

In order to confirm if the relation between the rotational speed of the gear in which the tooth surfaces thereof are polished and the reduction in the loss torque will be changed depending on the input torque, the inventors of the present application carried out another experimentation. This experimentation was carried out by changing the input torque to the second planetary gear set 6 in the sixth forward stage, and result of the experimentation is shown in FIG. 5. In FIG. 5, the triangle symbol also represents the loss torque of the case in which only the tooth surfaces of the short pinion gears 12 were polished, the circle symbol also represents the loss torque of the case in which only the tooth surfaces of the long pinion gears 14 were polished, and the square symbol also represents the loss torque of the case in which only the tooth surfaces of the second ring gear 15 were polished. Specifically, the dashed symbol represents the loss torque of the case in which same torque was applied to the second ring gear 15 as the foregoing experimentation, the white symbol represents the loss torque of the case in which the input torque to the second ring gear 15 was reduced 50%, and the black symbol represents the loss torque of the case in which no torque was applied to the second ring gear 15.

In FIG. 5, the horizontal axis represents an angular velocity of each gear 12, 14 and 15, and the vertical axis represents the difference between the loss torque of the second planetary gear set 6 in which the tooth surfaces of none of the gears was polished and the loss torque of the second planetary gear set 6 in which the tooth surfaces of any one of the gears are polished. As can be seen from FIG. 5, reduction in the loss torque is increased with an increase in the rotational speed (i.e., an angular velocity) of the gear irrespective of the input torque.

Thus, the inventors of the present application have confirmed that the transmission efficiency of the planetary gear set can be enhanced by polishing only the tooth surfaces of the gear rotated at the highest speed, as the case of polishing the tooth surfaces of all of the gears. As described, the pinion gears 9 are rotated at the highest speed in the first forward stage in the first planetary gear set 5, and the short pinion gears 12 are rotated at the highest speed in the sixth forward stage in the second planetary gear set 6. According to the preferred embodiment, therefore, only the tooth surfaces of the pinion gears 9 are polished in the first planetary gear set 5, and only the tooth surfaces of the short pinion gears 12 are polished in the second planetary gear set 6.

Thus, according to the preferred embodiment, the number of gears to be polished to enhance the transmission efficiency of the planetary gear set can be reduced drastically.

Figure 6:
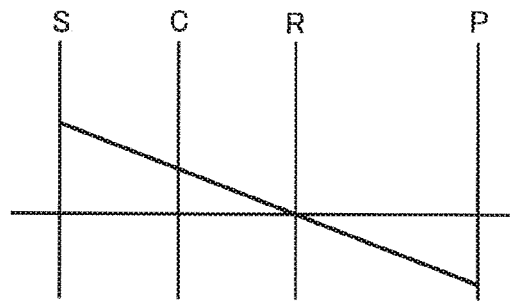
FIG. 6 is a nomographic diagram showing a situation in which the sun gear of the single-pinion planetary gear set is rotated at the highest speed in a predetermined gear stage.
Figure 7:
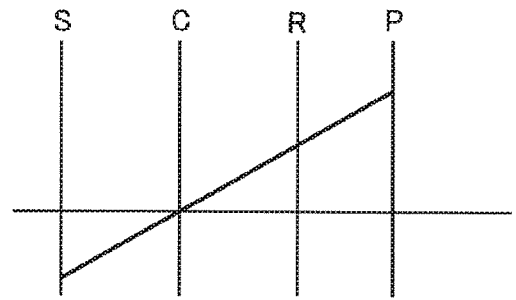
FIG. 7 is a nomographic diagram showing a situation in which the pinion gear of the single-pinion planetary gear set is rotated at the highest speed in another gear stage.

Instead, the transmission efficiency of the planetary gear set may also be enhanced by polishing the tooth surfaces of the gear rotated at the highest speed in the gear stage most frequently selected during propulsion. For example, given that the predetermined gear stage in which the sun gear S is rotated at the highest speed as shown in FIG. 6 is used more frequently than another gear stage in which the pinion gears P are rotated at the highest speed as shown in FIG. 7, the transmission efficiency of the planetary gear set may be enhanced by polishing the tooth surfaces of the sun gear S even though the top speed of the pinion gear P is higher than that of the sun gear S.

Figure 8:
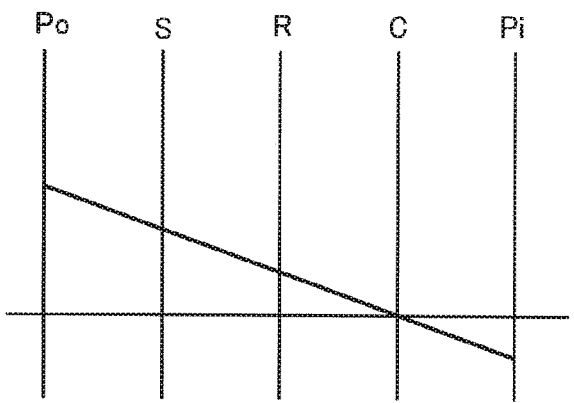
FIG. 8 is a nomographic diagram showing a situation in which the outer pinion of the double-pinion planetary gear set is rotated at the highest speed in a predetermined gear stage.
Figure 9:
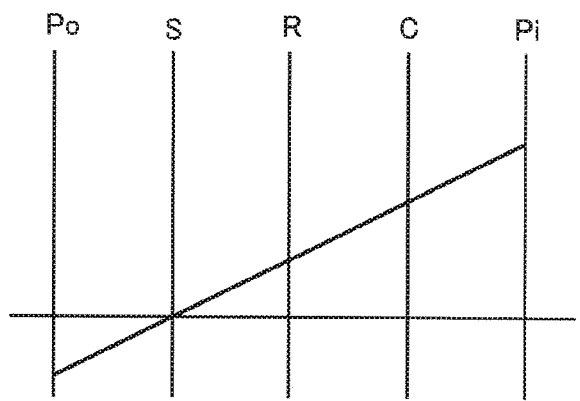
FIG. 9 is a nomographic diagram showing a situation in which the inner pinion of the double-pinion planetary gear set is rotated at the highest speed in another gear stage.
Figure 10:
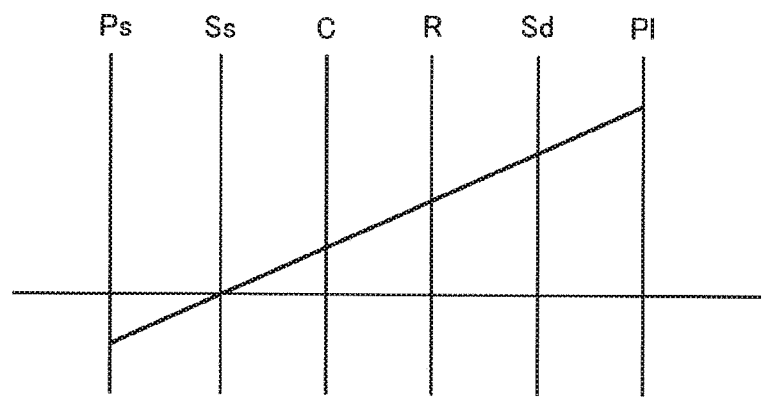
FIG. 10 is a nomographic diagram showing a situation in which the long pinion of the Ravigneaux planetary gear set is rotated at the highest speed in a predetermined gear stage.
Figure 11:
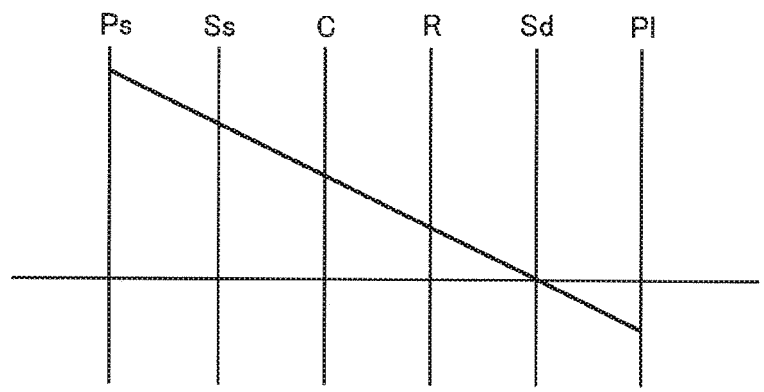
FIG. 11 is a nomographic diagram showing a situation in which the short pinion of the Ravigneaux planetary gear set is rotated at the highest speed in another gear stage.

Likewise, given that the predetermined gear stage in which the outer pinions Po are rotated at the highest speed as shown in FIG. 8 is used more frequently than another gear stage in which the inner pinions Pi are rotated at the highest speed as shown in FIG. 9, the transmission efficiency of the planetary gear set may also be enhanced by polishing the tooth surfaces of the outer pinions Po even though the top speed of the inner pinions Pi is higher than that of the outer pinion Po. Further, given that the predetermined gear stage in which the long pinions Pl are rotated at the highest speed as shown in FIG. 10 is used more frequently than another gear stage in which the short pinions Ps are rotated at the highest speed as shown in FIG. 11, the transmission efficiency of the planetary gear set may also be enhanced by polishing the tooth surfaces of the long pinions Pl even though the top speed of the short pinion Ps is higher than that of the long pinion Pl.

In addition, given that the different gears are rotated at the highest speed in different gear stage, the tooth surfaces of both of the gears rotated at the highest speed may also be polished to enhance the transmission efficiency of the planetary gear set. Here, the present application may also be applied to a speed reducing mechanism and a speed increasing mechanism in which a speed ratio is changed stepwise.

Figure 12:
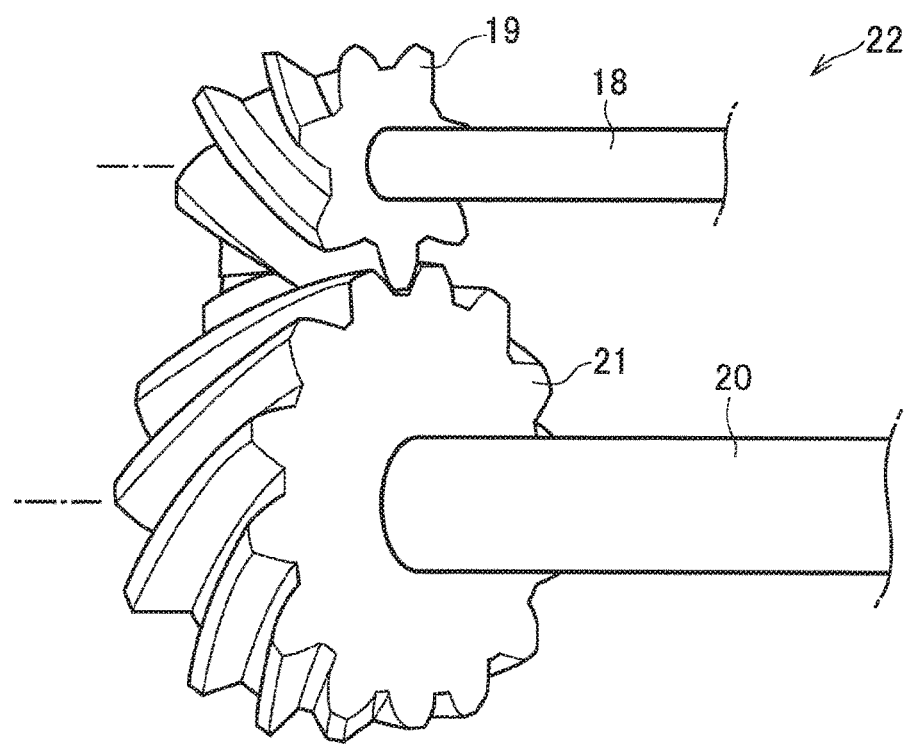
FIG. 12 is a schematic illustration showing a structure of the gear pair.

Turning now to FIG. 12, there is shown another embodiment in which tooth surfaces of one of gears of a gear pair 22 rotated at a higher speed are polished. As depicted in FIG. 12, the gear pair 22 comprises a first gear 19 fitted onto an input shaft 18, and a second gear 21 fitted onto an output shaft 20 while being meshed with the first gear 19. According to another embodiment, in the gear pair 22, the tooth surfaces of any one of the first gear 19 and the second gear 21 are polished to enhance the transmission efficiency of the gear pair 22.

Figure 13:
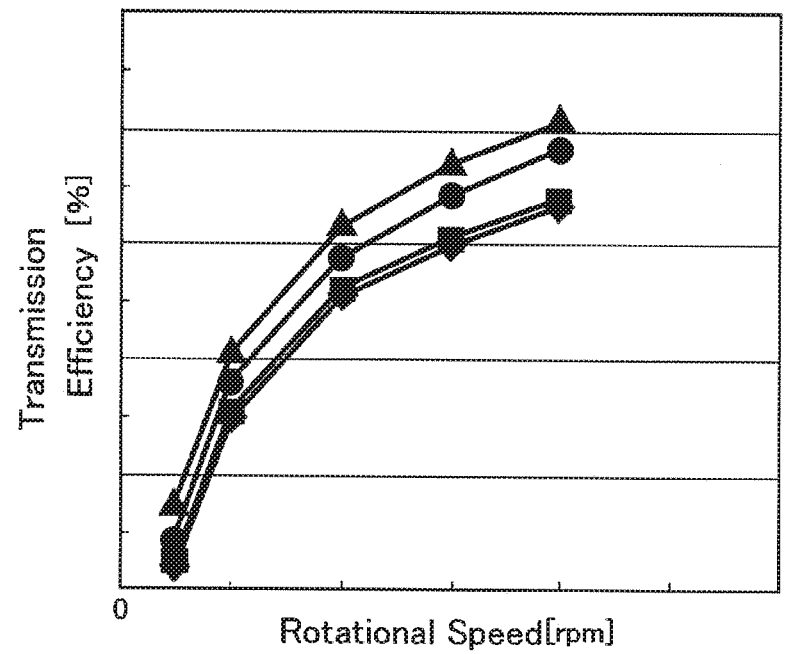
FIG. 13 is a graph indicating transmission efficiency of the gear pair shown in FIG. 12.

Measurement of the transmission efficiency of the gear pair 22 is shown in FIG. 13. In FIG. 13, the horizontal axis represents the rotational speed of the first gear 19 (i.e., a drive gear), and the vertical axis represents the transmission efficiency. Specifically, the transmission efficiency may be calculated by multiplying a torque of the output shaft 20 (i.e., an output torque) by a gear ratio, and by dividing the calculated value by a torque applied to the first gear 19 (i.e., an input torque). Accordingly, the higher transmission efficiency is indicated at the higher level in FIG. 13. In the gear pair 22, the first gear 19 is rotated at a higher speed than the second gear 21 (i.e., a driven gear).

In FIG. 13, "♦" represents the transmission efficiency of the gear pair 22 of a case in which the tooth surfaces of none of the first gear 19 and the second gear 21 was polished, "■" represents the transmission efficiency of the gear pair 22 of a case in which only the tooth surfaces of the second gear 21 were polished (by a lapping method), "▲" represents the transmission efficiency of the gear pair 22 of a case in which only the tooth surfaces of the first gear 19 were polished, and "+" represents the transmission efficiency of the gear pair 22 of a case in which the tooth surfaces of both of the first gear 19 and the second gear 21 were polished.

Figure 14:
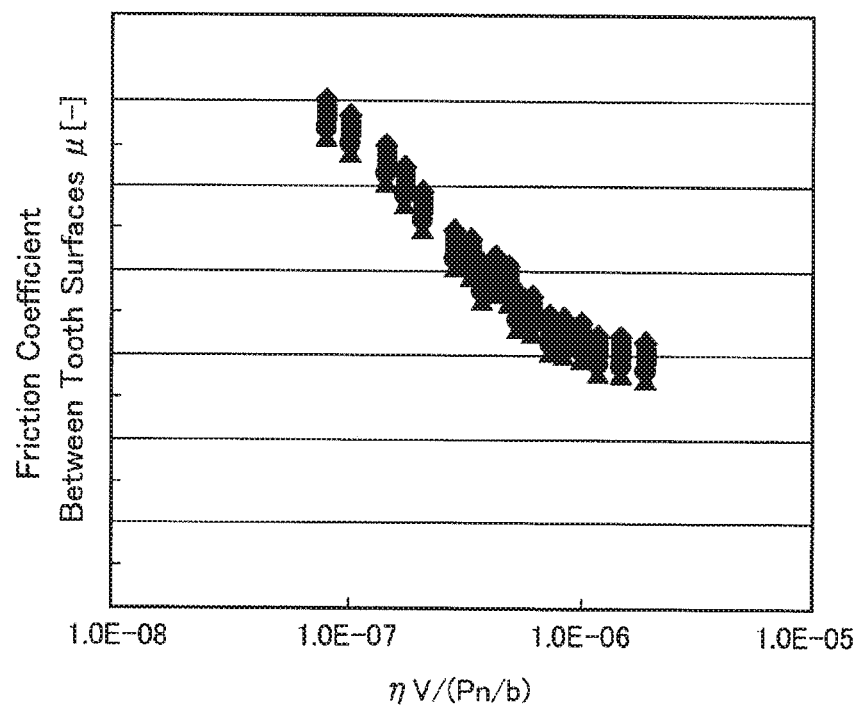
FIG. 14 is a Stribeck curve indicating a frictional condition between the first gear and the second gear of the gear pair.

FIG. 14 shows a Stribeck curve indicating a frictional condition between the first gear 19 and the second gear 21 prepared based on the data collected by the foregoing experimentations. In FIG. 14, the horizontal axis represents a value of ηV/(Pn/b) where "η" is viscosity of oil interposed between the mating tooth surfaces, "V" is a relative speed of the mating tooth surfaces, and "(Pn/b)" is a contact pressure between the mating tooth surfaces, and the vertical axis represents a measured value of a friction coefficient "μ" between the mating tooth surfaces.

As can be seen from FIGS. 13 and 14, the transmission efficiency of the gear pair can be enhanced by polishing only the gear tooth of the first gear 19 that is rotated higher than the second gear 21, as the case of polishing the gear tooth of both of the first gear 19 and the second gear 21. Thus, according to another embodiment, the number of gears to be polished to enhance the transmission efficiency of the gear pair 22 may also be reduced.

The gear pair 22 according to another embodiment may be used in a manual transmission not only to establish a low speed stage in which a speed ratio but also to establish a high speed stage. For example, in a case of using the gear pair 22 to establish the low speed stage, an input gear is rotated at a higher speed than an output gear. In this case, therefore, the transmission efficiency of the manual transmission may be enhanced by polishing the gear tooth of only the input gear. By contrast, in a case of using the gear pair to establish the high speed stage, the output gear is rotated at a higher speed than the input gear. In this case, therefore, the transmission efficiency of the manual transmission may be enhanced by polishing the gear tooth of only the output gear.

Although the above exemplary embodiment of the present application have been described, it will be understood by those skilled in the art that the present application should not be limited to the described exemplary embodiment, and various changes and modifications can be made within the spirit and scope of the present application.

What is claimed is:

1. A gear assembly including a plurality of gears to transmit torque of a prime mover to an output member, wherein
   tooth surfaces of only a first gear that is rotated at the highest speed among the plurality of gears are individually finished into a plateau surface, and
   a parameter representing a surface roughness of each of the tooth surfaces of the first gear is smaller than those of the tooth surfaces of the other of the plurality of gears.

2. The gear assembly as claimed in claim 1, wherein the parameter includes a skewness of the plateau surface.

3. The gear assembly as claimed in claim 1, wherein an arithmetic mean roughness Ra of each of the plateau surface is smaller than 0.15 μm, and wherein a reduced peak height Rpk is adjusted between 0.01 μm and 0.1 μm.

4. The gear assembly as claimed in claim 1, wherein the gear assembly comprises:
   an input element to which torque of the prime mover is applied;
   an output element that delivers the torque to the output member;
   a reaction element that establishes a reaction torque to allow the output element to output the torque applied to the input element; and
   a pinion gear that is supported by at least said one of the rotary elements, the pinion gear is meshed with at least one of another rotary elements, and the first gear includes a gear that is rotated at a highest speed in said another rotary elements and the pinion gear.

5. The gear assembly as claimed in claim 4, wherein
   the gear assembly includes a geared transmission in which a gear stage thereof is changed stepwise, rotational speeds of the rotary elements and the pinion gear are changed depending on the gear stage of the gear assembly, and the first gear includes a gear that is rotated at a highest speed in said another rotary elements and the pinion gear in a predetermined gear stage.

6. The gear assembly as claimed in claim 5, wherein the predetermined gear stage includes a gear stage that is selected most frequently.

7. The gear assembly as claimed in claim 4, wherein the pinion gear includes a first pinion meshed with one of said another rotary elements, and a second pinion gear meshed with another one of said another rotary elements.

8. The gear assembly as claimed in claim 1, further comprising:
   a gear pair including the first gear to which the torque of the prune mover is applied, and
   a second gear connected to the output member while being meshed with the first gear, and wherein the first gear is rotated faster than the second gear.

9. The gear assembly as claimed in claim 1, further comprising:
   a gear pair including the first gear connected to the output member, and
   a third gear meshed with the first gear to which the torque of the prime mover is applied, and wherein the first gear is rotated faster than the third gear.

* * * * *